United States Patent [19]

Kirschner

[11] 4,095,482
[45] Jun. 20, 1978

[54] RACK AND PINION STEERING APPARATUS

[75] Inventor: Peter Kirschner, Wolfsburg, Germany

[73] Assignee: Volkswagenwerk Aktiengesellschaft, Germany

[21] Appl. No.: 743,915

[22] Filed: Nov. 22, 1976

[30] Foreign Application Priority Data

Feb. 18, 1976 Germany .............................. 2606365

[51] Int. Cl.² ........................... B62D 3/12; B62D 1/20
[52] U.S. Cl. ......................................... 74/498; 74/422
[58] Field of Search ............................................ 74/498

[56] References Cited

U.S. PATENT DOCUMENTS

| | | | |
|---|---|---|---|
| 3,623,379 | 11/1971 | Bradshaw et al. | 74/498 |
| 3,630,099 | 12/1971 | Miyoshi | 74/498 |
| 3,792,624 | 2/1974 | Pitner | 74/498 X |
| 3,844,181 | 10/1974 | Bayle | 74/498 |
| 3,844,182 | 10/1974 | Bradshaw et al. | 74/498 |
| 3,979,968 | 9/1976 | Ceccherini | 74/498 |

Primary Examiner—Leonard H. Gerin
Attorney, Agent, or Firm—Brumbaugh, Graves, Donohue & Raymond

[57] ABSTRACT

A rack and pinion steering apparatus is provided with a compression spring mechanism bearing against the rack and urging the rack into engagement with a pinion connected to the steering wheel. The compressing spring mechanism is maintained against the pinion with a self-adjusting mechanism for removing play resulting from wear.

3 Claims, 1 Drawing Figure

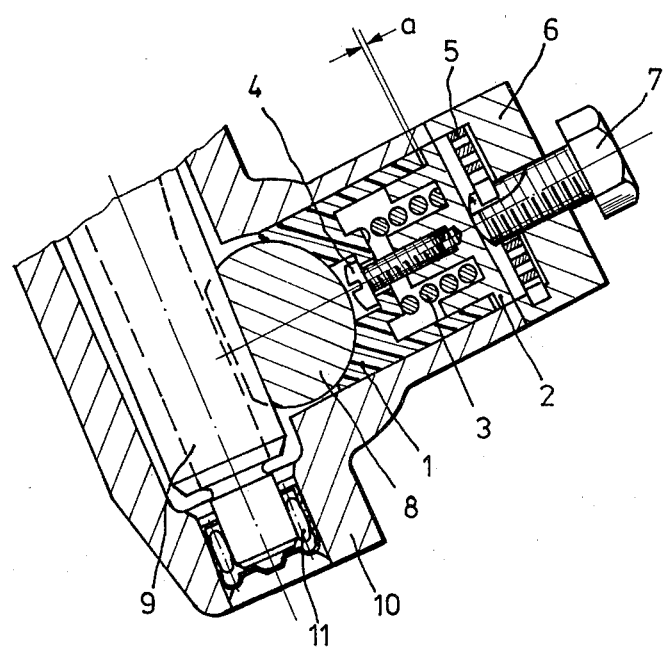

RACK AND PINION STEERING APPARATUS

BACKGROUND OF THE INVENTION

This invention relates to rack and pinion steering mechanisms and particularly to such mechanisms wherein there is provided a compression spring mechanism urging the rack into engagement with the pinion.

In prior art steering systems of this type, a compression mechanism is provided having a coil spring which urges a pressure member against the rack to provide firm engagement with the pinion and prevent rattling from gear play. In accordance with the prior construction of such devices, a set screw is provided between the pressure member and the housing to adjust the play of the compression mechanism. In order to avoid rattling noises, the amount of play had to be precisely adjusted. As the rack and pressure member wear during normal use, the amount of play is increased and readjustment of the set screw is required.

It is therefore an object of the invention to provide a new and improved rack and pinion steering mechanism.

It is a further object of the invention to provide such a mechanism having a self-adjusting device, whereby there is automatic compensation for play resulting from component wear.

SUMMARY OF THE INVENTION

In accordance with the invention, there is provided a steering apparatus for a motor vehicle including a housing, a rack, displaceable along a longitudinal axis and in engagement with a rotatable pinion in the housing, and compression spring means in the housing urging the rack into engagement with the pinion. The compression spring means has an adjustable compression distance. A self-adjusting mechanism is arranged between the compression spring means and the housing for eliminating play between the compression means and the housing.

In a preferred embodiment, the compression means includes a pressure member contacting the rack, a base in contact with the self-adjusting mechanism, a spring urging the pressure member and the base apart by the compression distance and a screw arranged between the pressure member and the base for adjusting the compression distance. The self-adjusting mechanism may include a self-locking screw arranged to have an effective screw length between the housing and the compression means. A pretensioned spring acting on the screw urges the screw into a greater effective screw length to eliminate play between the compression means and the housing.

For a better understanding of the present invention, together with other and further objects, reference is made to the following description, taken in conjunction with the accompanying drawing, and its scope will be pointed out in the appended claims.

BRIEF DESCRIPTION OF THE DRAWING

The drawing shows a cross-sectional view of a rack and pinion steering mechanism in accordance with the invention.

DESCRIPTION OF THE INVENTION

Referring to the drawing, there is shown a cross-sectional view of a rack and pinion steering mechanism. A pinion 9, which is connected to the steering wheel, engages a rack 8, which is moveable along a longitudinal axis perpendicular to the view of the drawing. Pinion 9 is maintained by a bearing 11 mounted in the bottom portion of the steering gear housing 10. Rack 8 is urged against pinion 9 by a compression spring means, comprising pressure member 1, base 2, and coil spring 3. Spring 3 urges pressure member 1 and base 2 apart by a predetermined compression distance $a$. Distance $a$ may be adjusted using screw 4 prior to assembly of the steering mechanism. In a steering mechanism of the type shown, it is desirable to maintain a constant compression distance $a$ independent of the wear of rack 8, pinion 9 and pressure member 1. To achieve constant maintenance of compression distance $a$, there is provided a self-adjusting mechanism mounted to the end plate 6 of housing 10. In accordance with the illustrated embodiment, the self-adjusted mechanism consists of coil spring 5 and self-locking screw 7. Spring 5 is pretensioned to provide a force on screw 7 urging the screw further into end plate 6 and against base 2. The force of adjusting spring 5 is selected to be sufficient to rotate screw 7 when there is play between base member 2 and screw 7, but is insufficient to compress spring 3 of the compression spring means thereby to reduce the compression distance $a$. Spring 5 therefore constantly urges screw 7 into a greater screw length between end plate 6 and base 2.

The principle advantage of the invention is that the self-adjusting mechanism provided on end plate 6 constantly removes play in the steering mechanism as the component parts wear. This constant adjustment eliminates the need for costly manual adjustment and prevents the development of rattling noises in the steering mechanism after long use of the vehicle.

Another advantage of the invention results from the fact that the compression mechanism may be preadjusted to the compression distance $a$ prior to assembly of the steering mechanism. After assembly, adjustment of distance $a$ is no longer required since adjustment on account of wear of the steering mechanism is separate from the adjustment of the compression distance. Two mechanisms are therefore provided, a compression mechanism having a preset compression distance and tension, and an adjustment mechanism for removing play which develops on account of component wear.

Those skilled in the art will recognize that other self-adjusting mechanisms may be used in the steering apparatus of the invention. For example, there may be provided a locking wedge driven against an inclined surface by a compressed spring. As wear develops in the steering components, the wedge will be urged further into an inclined opening between surfaces attached to end plate 6 and base 2, thereby to increase the effective distance between end plate 6 and base 2 and remove play.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. Steering appartus for a motor vehicle comprising a housing, a rack, displaceable along a longitudinal axis and engaged with a rotatable pinion in said housing, compression spring means in said housing urging said rack into engagement with said pinion and having an adjusted compression distance, and a self-adjusting mechanism arranged between said compression means and said housing, for eliminating play between said compression means and said housing.

2. Steering apparatus as specified in claim 1 wherein said compression means comprises a pressure member for contacting said rack, a base in contact with said self-adjusting mechanism, a spring urging said pressure member and said base apart by said compression distance and a screw arranged between said pressure member and said base for adjusting said compression distance.

3. Steering apparatus as specified in claim 1 wherein said self-adjusting mechanism comprises a self-locking screw, arranged to have an effective screw length between said housing and said compression means, and a prestressed spring acting upon said screw to urge said screw into a greater effective screw length thereby to eliminate play between said compression means and said housing.

* * * * *